(12) United States Patent
Simske et al.

(10) Patent No.: US 8,798,313 B2
(45) Date of Patent: Aug. 5, 2014

(54) COUNTERFEIT DETECTION SYSTEM

(75) Inventors: Steven J. Simske, Fort Collins, CO (US); Malgorzata M. Sturgill, Fort Collins, CO (US); Jason S. Aronoff, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 13/382,697

(22) PCT Filed: Jul. 9, 2009

(86) PCT No.: PCT/US2009/050089
§ 371 (c)(1),
(2), (4) Date: Jan. 6, 2012

(87) PCT Pub. No.: WO2011/005257
PCT Pub. Date: Jan. 13, 2011

(65) Prior Publication Data
US 2012/0114170 A1    May 10, 2012

(51) Int. Cl.
*G06K 9/00* (2006.01)
(52) U.S. Cl.
USPC ............ 382/100; 382/135; 382/298; 345/670
(58) Field of Classification Search
CPC ..... G06K 9/036; G06K 9/00577; G07D 7/20; Y10S 902/07
USPC ........................ 382/100, 135, 137, 224, 298; 345/660–671
See application file for complete search history.

(56) References Cited

U.S. PATENT DOCUMENTS

| | | | | |
|---|---|---|---|---|
| 7,272,260 | B1* | 9/2007 | Kakiuchi et al. | 382/217 |
| 7,676,058 | B2* | 3/2010 | Fan | 382/100 |
| 7,805,011 | B2* | 9/2010 | Klamer et al. | 382/232 |
| 7,864,979 | B2* | 1/2011 | Fan et al. | 382/100 |
| 7,949,175 | B2* | 5/2011 | Fan | 382/135 |
| 2009/0100096 | A1 | 4/2009 | Erlichson et al. | |

FOREIGN PATENT DOCUMENTS

| | | |
|---|---|---|
| JP | 05-237095 | 9/1993 |
| JP | 07-123246 | 5/1995 |

OTHER PUBLICATIONS

International Search Report for Application No. PCT/US2009/050089 dated Mar. 31, 2010 (13 pgs).
Simske, "Low Resolution Photo/Drawing Classification: Metrics, Method and Archiving Optimization", Proceedings of the 2005 ACM Symposium on Doc Engineering, pp. 127-129.

(Continued)

*Primary Examiner* — Shefali Goradia (57) ABSTRACT

A counterfeit detection system is disclosed herein. The system includes an image reduction system for minimizing size of at least one original image using a plurality of different reduction strategies to generate a plurality of minimized images. The system further includes a classification system which includes a first sub-system for generating at least one accuracy comparative assessment metric for each of the plurality of minimized images, a second sub-system for comparing the at least one accuracy comparative assessment metric for each of the plurality of minimized images with an accuracy assessment metric for the at least one original image, and a third sub-system for determining if at least one of the plurality of minimized images can be transmitted with improved or equivalent classification accuracy at a reduced bandwidth when compared to the original image are also part of the system.

17 Claims, 2 Drawing Sheets

(56) References Cited

OTHER PUBLICATIONS

Wang, et al. "Image Quality Assessment: From Error Visibility to Structural Similarity," IEEE Transactions on Image Processing, vol. 13, No. 4, Apr. 2004, pp. 600-612.

Li, D. et al. "Atmospheric Turbulence, Degraded-Image Restoration by Kurtosis Minimization", IEEE Geoscience & Remote Sensing Ltrs., vol. 6, No. 2, Apr. 2009, pp. 244-247.

Li, et al. "Atmospheric Turbulence-Degraded Image Restoration Using Principal Components Analysis," IEEE Geoscience & Remote Sensing Ltrs., vol. 4, No. 3, Jul. 2007, pp. 340-344.

L,I et al. "Blur Identification Based on Kurtosis Minimization," Proc. IEEEICIP, IEEE, Genoa, Italy, 2005, pp. 905-908.

Mitchell, et al. "Reconstruction Filters in Computer Graphics," Computer Graphics, vol. 22, No. 4, Aug. 1988, pp. 221-228.

Simske, et al. "Comparison of Image-Based Functional Monitoring Through Resampling and Compression", IGARSS 2009, IEEE, Cape Town, South Africa, Submitted, 2009 (5 pgs).

Toye, et al. "Using Smart Phones to Access Site-Specific Services," The Smart Phone, Pervasive Computing, IEEE, 4, 2005, pp. 60-66.

Yang, et al. "An Automatic Sign Recognition and Translation System," Interactive Systems Laboratory, Proc. Workshop Perceptive User Interfaces, 2001, pp. 1-8.

\* cited by examiner

COUNTERFEIT DETECTION SYSTEM

BACKGROUND

The present disclosure relates generally to a counterfeit detection system.

Product labeling and security packaging are important components of brand protection, product tracking and authenticating, as well as of anti-counterfeiting initiatives. Such labels/packages may, in some instances, enable authorization, and may be authenticable (e.g., containing encoded/encrypted information that can be decoded/decrypted for security purposes), and unique (i.e., differentiable from any other printed material). In an effort to create such labels/packages, a unique ID, in the form of, for example, a deterrent or mark may be added. Furthermore, measures are often taken to enhance the probability that the product cannot be counterfeited, for example, by adding authenticating data (i.e., payload information) to the deterrent or mark, and/or by generating non-security printed areas with signatures idiosyncratic to their printing process (e.g., print engine type, print settings, etc.) which can be analyzed forensically.

BRIEF DESCRIPTION OF THE DRAWING

Features and advantages of embodiments of the present disclosure will become apparent by reference to the following detailed description and drawings.

DETAILED DESCRIPTION

Embodiments of the system and method disclosed herein advantageously afford a non-biased format for testing a multiplicity of reduction strategies simultaneously and quantitatively. The strategies are performed on one or more images to best identify an image reduction process that results in minimized images that can be transmitted with a desirable throughput and classification accuracy. The process is often a training-based or backend process (i.e., server/service based, "cloud" computing based, etc.). This advantageously enables one to determine one or more suitable image reduction processes (i.e., which result in a minimized image that is transmittable with equivalent or improved classification accuracy at a reduced bandwidth when compared to its corresponding original image) to be performed on the image(s) prior to deployment of such image(s) for product labeling and/or security packaging. As such, the embodiments of the method disclosed herein enable one to determine an optimum size of an image for deployment based upon a quantitative evaluation of the image in a form which is representative of the image after transmission.

The term "size" as used herein in conjunction with an image refers to the amount of space (e.g., in bytes) that the image occupies in memory or storage.

The method(s) disclosed herein is/are generally carried out utilizing a system which includes sub-systems and means for performing each of the steps. In one non-limiting example, the system includes a computer or enterprise computing system and sub-systems (e.g., including programs or software) configured to i) minimize selected original image(s) using a plurality of different reduction strategies, ii) generate accuracy comparative assessment metric(s) for each minimized image, iii) compare the accuracy comparative assessment metric(s) of each minimized image with accuracy assessment metric(s) of the corresponding original image, and iv) determining whether one or more of the minimized images is capable of being transmitted with improved or equivalent classification accuracy at a reduced bandwidth (when compared to the transmission of the corresponding original image).

As used herein, the term "enterprise computing system" means a network of interconnected computers, including virtualized and/or redundant processors, banks of processors and/or servers, etc. It is to be understood that the components of the system may be implemented in a consolidated location, or portion(s) of the system may be implemented at different locations.

The hardware of such a system includes an electronic processing device, such as, for example, a controller, a micro controller, a microprocessor, a host processor, an application specific integrated circuit (ASIC), and/or a reprogrammable hardware logic device (such as a field programmable gate array (FPGA)). It is to be understood that the electronic processing device may be a processor working in conjunction with a central processing unit (CPU) performing the function of a general-purpose processor.

Computer program(s) and/or software (e.g., computer readable code) may be loaded onto the computer or enterprise computing system, and stored in a memory thereof. Computer program(s) and/or software (e.g., computer readable code) may also be part of a sub-system (e.g., an image reduction system or a classification system) of the computer or enterprise computing system. In either instance, such programs and/or software are executable via the processing device. Examples of such programs(s) and/or software include those configured to toggle (sequence) through available reduction strategies in a non-biased format (i.e., not dependent upon the metrics used to compare minimized and original images) and those configured to determine which strategies may be used to transform the original image into a minimized image with improved or equivalent classification accuracy.

Figure 1:
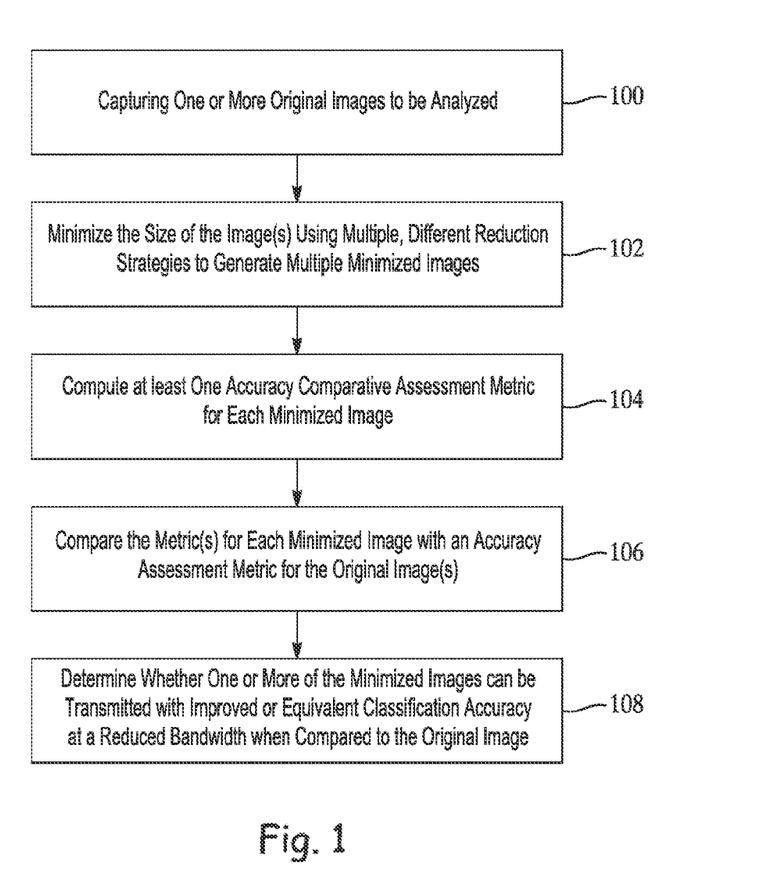
FIG. 1 is a schematic diagram depicting an embodiment of a method for enhancing counterfeit detection.

Referring now to FIG. 1, a schematic flow diagram of an embodiment of the counterfeit detection method disclosed herein is depicted. As shown at reference numeral 100, one or more original images are captured and are transmitted to the computer or enterprise computing system. The image(s) may be captured using an electronic device. In a non-limiting example, the electronic device is a scanner. Another suitable electronic device is a digital camera (embodied in, for example, a cellular phone, a personal digital assistant, or the like), an inspection camera, a tabletop imager, or the like.

The original images are often part of a training set of images, and are selected because they are similar to or are selected samples of images that are typically counterfeited or are likely to be counterfeited. It is to be understood that when actual image samples are not available, historical data may be used to select an image that represents a best guess at an image that is likely to be counterfeited. Training set images are those that have not yet been deployed with/on an object. When the embodiments of the method disclosed herein are utilized with training set images, the method is generally being used to determine how to minimize such images prior to their deployment without deleteriously compromising classification accuracy and advantageously reducing the bandwidth used to electronically transmit and receive such images. It is to be understood, however, that the embodiments of the method disclosed herein may also be utilized with images that have been deployed with an object. In some instances and as an example, the method is being used to determine how to revise the already deployed images in order to enhance any other like images that will be deployed in the future. Such deployed images may be captured by any user (such as, for example, a customer, inspector, authenticator, or the like) after deployment specifications are set.

The image(s) may or may not include variable data, and thus may or may not be security deterrents.

Accuracy assessment metrics or features are computed for each original image. This is accomplished for comparative purposes downstream in the method. Such accuracy assessment metrics define the original image(s) in terms of one or more of its characteristics. Metrics include any data extracted from the image. Such data varies from image to image, and is useful in comparing different classes of images. The set of metrics that is used to define the specific accuracy assessment metrics for each original image is general enough to accommodate a wide variety of image types. Such metrics may include histogram information for each of the primary printing (cyan, magenta and yellow) and displaying (red, green and blue) colors. In addition, the metric set may also include information extrapolated from the hue/saturation/intensity, or HSI, histograms. Such information may include mean, standard deviation, skew and kurtosis of the histogram, along with histogram entropy and "energy spectral density" by band. In some instances, the functional metric set may also include frequency information including the percentage of energy spectral density in various frequency bands, etc. (as determined by Image Fast Fourier Transforms (FFTs)). Still other suitable metrics in the metric set may include halftone patterning, palette/gamut, and region size, shape and/or distribution, and combinations thereof. It is to be understood that this is not an exhaustive list, and that any other suitable metrics may be used to characterize the minimized/transformed images.

Non-limiting examples of specific accuracy assessment metrics that are computed include image entropy ("e"), standard deviation of the image histogram ("Std($H_l$)"), the percent of pixels with the largest relative neighborhood variance ("% Edges"), the mean value for these edges ("$\mu_{Edge}$"), the mean pixel variance ($PV_{xy}$) based on the local differences in pixel intensity, mean saturation ("$\mu_{sat}$"), mean connected component region size and variance may be computed based on pixel intensity or saturation.

More specifically, image entropy and standard deviation of the image histogram may be computed from the intensities of the individual pixels, $p_k$ (see, e.g., Equations 1 and 2).

$$e = -\sum_{k=0}^{255} \frac{p_k}{\sum_{k=0}^{255} p_k} * \ln\left(\frac{p_k}{\sum_{k=0}^{255} p_k}\right) \quad (1)$$

$$\text{Std}(H_1) = \frac{\sum_{k=0}^{255} p_k * (k-\mu)^2}{\sum_{k=0}^{255} p_k} \quad (2)$$

As mentioned herein, the percent of pixels with the largest relative neighborhood variance, the mean value for these edges, and the mean pixel variance are based on the local differences in pixel intensity (see Equation 3).

$$PV_{xy} = \frac{(P_{x-1,y-1} - P_{xy}) + (P_{x-1,y+1} - P_{xy}) + (P_{x+1,y-1} - P_{xy}) + (P_{x+1,y+1} - P_{xy})}{4} \quad (3)$$

In an embodiment, the mean saturation is computed via Equation 4:

$$255*(1-\min(R,G,B))/(R+G+B). \quad (4)$$

Min(R,G,B) is the minimum value of the red, green and blue channels of a color pixel, normalized to be 0.0 if fully unsaturated, and 1.0 if fully saturated.

In Equations 1, 2 and 4, it is to be understood that the value "255" can be replaced with the suitable $2^N-1$ value where N=number of bits. As such, for 16-bit data, $2^N-1=65536-1=65535$, and for 24-bit data, $2^N-1=16777216-1=16777215$.

In another embodiment, the mean connected component region size and variance are computed after thresholding the images based on pixel intensity ("$\mu_{Size-Intensity}$" and "$\mu$Size-intensity-$\sigma$-$\sigma$", respectively) or based on saturation ("$\mu_{Size-Saturation}$" and "$\mu_{Size-Saturation-\sigma*\sigma}$", respectively). In an embodiment, a binary image is computed which is the size of the original image. When performing region identification and conversion to binary, pixels of interest having intensity or saturation which pass a threshold (which is typically automatically determined by the system used) are labeled "1" and those which do not pass the threshold are labeled "0". The pixels of interest can then be further processed to form regions of interest for further analysis. More particularly, connected components or regions may be formed, and the mean and variance of the size of the two sets of regions (i.e., foreground and background) may be computed.

After the specific accuracy assessment metrics are computed for the original image(s), such metrics are stored for later comparisons.

As shown at reference numeral 102, the captured image(s) is/are then minimized using a plurality of different reduction strategies. Each reduction strategy performed on the captured image results in the formation of a minimized image (i.e., the original image having at least its size reduced). In order to determine the most suitable reduction strategy for a particular original image, two or more different strategies are run on that particular image, and as such, two or more different minimized images are generated. When multiple original images are analyzed at the same time, it is to be understood that the same reduction strategies or different reduction strategies may be used. It is to be understood that it is desirable to reduce the original image size so that the network bandwidth of a system transmitting or receiving an image for authentication does not prohibit such transmission or receipt (e.g., because the bandwidth cannot accommodate such a large image) during object authentication processes. Reducing the image size will open up any residual bandwidth for other tasks as well.

Upon receiving the captured image, the user of the computer or enterprise computing system may toggle through the reduction strategies stored thereon in order to determine which reduction strategies are suitable for the image. It is to be understood that the user may select any strategy or combination of strategies to perform on the image(s). In one embodiment, the user of the system may input information about a predetermined throughput accuracy (discussed further hereinbelow), and the system may toggle (sequence) through reduction strategies to determine which have been designated or associated with such predetermined throughput accuracy. In another embodiment, the system settings may be used to select the reduction strategies. Such settings may be set to initially designate every possible reduction strategy combination, but may later be reset to designate particular strategies with particular image types based upon history. In still another embodiment, the user of the computer or enterprise computing system may use historical information (e.g., regarding other tested images) to determine the appropriate reduction strategies.

The reduction strategy may be any suitable image reduction algorithm or combination of algorithms which is/are capable of reducing the image size. Such strategies are executable via the electronic processing device and are generally non-reversible. Non-limiting examples of such image reduction algorithms include down-sampling algorithms/strategies, compression algorithms/strategies, sampling algorithms/strategies, cropping algorithms/strategies, mosaic algorithms/strategies, cartooning algorithms/strategies, algorithms/strategies for generating paletted images, tokenizing algorithms/strategies, or the like, or combinations thereof. Down-sampling strategies involve reducing the physical dimensions (e.g., height and width) of the image through re-sampling. An example of a suitable down-sampling technique is ImageMagick's® resample operation, which is based on the Mitchell and Netravali algorithm. Compression strategies include lossy or JPEG compression, which reduces the information in the image without reducing the physical dimensions. It is to be understood that some images will compress more than others when the same level of compression is performed due, at least in part, to differences in image header (non-image data) size. Reduction strategies may include combinations of the listed examples. For example, a reduction strategy may include a down-sampling strategy and a compression strategy where the image physical dimensions are reduced through re-sampling and the information in the image is reduced through a lossy compression strategy.

The listed strategies/algorithms are set forth as examples, and it is to be understood that other image reduction algorithms not listed are suitable for use in the methods disclosed herein.

The number of minimized images produced may depend upon the number of original images processed, and the number of different reduction strategies applied to each of the original images.

Accuracy assessment metrics or features are computed for each minimized image, as shown at reference numeral 104. It is to be understood that the accuracy assessment metric(s) computed for the minimized images include at least one of the metrics computed for the original image(s). For example, if the standard deviation of the histogram metric is computed for the original image(s), this may be the single metric computed for the minimized images. Similarly, if the standard deviation of the histogram metric and the image entropy metric are computed for the original image(s), both of these metrics may be computed for the minimized images. In one embodiment, however, the final set of metrics used for classification may also depend upon the minimized image size. As such, one or more of the metric computed for the original image(s) may not be suitable when classifying the minimized image(s).

The method then includes comparing one or more metrics for each of the minimized images with the corresponding metrics for the corresponding original image, as shown at reference numeral 106. It is to be understood that the results of the comparison will indicate which minimized image has equivalent or improved classification accuracy when compared to its original image, and thus which reduction strategy will be a suitable image size reduction process for subsequently deployed images.

A classification approach may be used to compare the metrics of the minimized images with the metrics of the original image in order to determine which images are authentic, and to determine which reduction strategy/strategies best reduce(s) the captured image while maintaining classification accuracy. In a metric-based classification approach (such as that described in Simske et al., "Low-resolution photo/drawing classification: metrics, method and archiving optimization", *Proceedings of the 2005 ACM Symposium on Document Engineering*, pp. 127-129 (2005, ISBN-59593-240-2), which is incorporated herein by reference in its entirety), the accuracy assessment metrics are suitable for automatic classification of the images by type using a decision algorithm. It is to be understood that any classifier algorithm/system may be selected. In general, such systems (e.g., feature selection based classifiers) prune the metrics to determine those metrics which provide the best accuracy for the image classification. The selected metrics are then used to separate (i.e., classify) one class of images from another.

One non-limiting example of the classifier pruning the metrics involves selecting the metric with the best accuracy, selecting the metric with the second best accuracy, and then determining if the combination of two best metrics improves the overall accuracy of the image. Additional metrics will be selected and the combined overall accuracy computed until no improvement in overall accuracy is obtained.

In one embodiment, the classifier (e.g., a binary classifier) is based upon the assumption of a Gaussian distribution for each of the metrics, and provides the statistical confidence at the critical point ($\sigma_{CPt}$), which is the accuracy during classification of each metric. The mean critical point of each of the minimized image metrics (referred to as $\mu(\alpha_{CPt})_{minimized}$) is computed for the minimized images and is compared to the mean critical point that is computed for each of the original image metrics (referred to as $\mu(\alpha_{CPt})_{original}$). As such, if 100 minimized images are generated and such images have 5 metrics, then 5 critical values may be computed, one for each metric. If the $\mu(\alpha_{CPt})_{minimized}$ for a particular metric of the minimized image is greater than or equal to the $\mu(\alpha_{CPt})_{original}$ for a corresponding metric of the original image, it can be determined that the size reduction strategy used to transform the original image is sufficient to obtain a minimized image that can be classified at the same or a higher level of accuracy than the original image while also reducing the bandwidth for image transmission.

The $\mu(\alpha_{CPt})_{minimized}$ is multiplied by 100 in order to determine the classification accuracy for a particular minimized image. The classification accuracy for each metric indicates the relative effectiveness of such metric or combination of metrics.

The determination of whether the minimized images are authentic or counterfeit is based upon the weighted combination of the metrics. Essentially, the weighted combination indicates one class (authentic) or the other (counterfeit). Calculating the weighted combination may be accomplished via any suitable technique, including, for example, linear discrimination analysis or Fisher's linear discriminant.

It is to be understood that the reduction strategy used to generate the minimized image having a desirable $\mu(\alpha_{CPt})_{minimized}$, accuracy percentage, and classification may be selected for future deployment of this image, as shown at reference numeral 108. It is believed that by implementing the corresponding reduction strategy prior to future image deployment, the deployed image i) may be transmitted at a reduced bandwidth, and ii) will not be degraded for authentication purposes after its capture (e.g., exposed to scanning, etc.).

It is to be further understood that the method disclosed herein may also result in the generation of alternative counterfeit strategies. For example, five original images may form a desirable set for deployment. However, after the images are minimized and tested using the method disclosed herein, only four of the five minimized images classify with full accuracy (i.e., 100%). As an alternative deployment plan, the four minimized images may be selected for final deployment and counterfeit detection rather than the set of five images. At least in part because of the increased classification accuracy of each of the four image types, the overall classification accuracy associated with the package or label may be improved even without the transmission of the fifth image.

The overall increase in imaging bandwidth is referred to herein as $@A_{TF}$, or at-accuracy throughput factor. $@A_{TF}$ is the relative number of reduce-sized or minimized images (compared to the original images) that can be successfully classified without reduced accuracy using the same transmission resources. The metric $@A_{TF}$ is also representative of the relative number of minimized images that are successfully assigned to "counterfeit" or "authentic" classes with an accuracy that is greater than or equal to the accuracy obtained for the original images (where all of the image features are used simultaneously), while using the same transmission resources having the same overall memory size. Generally, when the $@A_{TF}$ is greater than 1, the minimized image is more suitable for transmission than the original image. Larger $@A_{TF}$ values are better as long the corresponding image classification accuracy (of the minimized image) is greater than or equal to the classification accuracy afforded by the original images. Larger $@A_{TF}$ values indicate that more of the minimized images can be transmitted (compared to the original images) because such images take up less memory. In one embodiment of the method, a desired improved throughput is predetermined, and as long as the $@A_{TF}$ value is greater than or equal to this predetermined throughput, the selected minimized images for deployment may be based upon improving the overall accuracy of the metrics. As such, the system may be used to optimize the accuracy and/or the throughput to a predetermined level.

In still another embodiment of the method, prior to performing the method shown in FIG. 1, a desirable predetermined at-throughput accuracy factor may be selected for the minimized image(s) that are ultimately selected for subsequent deployments. When a desirable at-throughput accuracy factor is predetermined, the system may select the reduction strategies and classifier based upon this predetermined at-throughput accuracy factor. More particularly, the reduction strategies may be matched with each original image in an effort to achieve the desired overall $@A_{TF}$ with the highest overall accuracy. The system will also choose the best classifier for the reduction strategy combination so as to achieve the best possible @ATF.

The ability of a classifier to provide higher accuracy for the minimized (down-sampled, compressed, etc.) images in the method disclosed herein is counterintuitive, at least in part because for most classifiers it is generally expected that the classification accuracy will decrease with increased reduction (e.g., compression and/or down-sampling). In the embodiments disclosed herein, the system determines which, if any, classifiers can provide improved classification accuracy over that obtained for the original (non-compressed, non-down-sampled, etc.) images. The computation of @ATF (as described herein) is then based on comparing the accuracy for the minimized image(s) obtained for any classifier compared to the classification accuracy for the original image. Tightly data-fitted classification systems, e.g., those using support vector machines (SVM), may not provide improved accuracy for the minimized image(s) over the accuracy they achieve for the original images, and so @ATF=1.0 throughout. However, if it is determined that an alternative classification system can be used to provide increased accuracy for a set of minimized (e.g., compressed/down-sampled) images (compared to originals analyzed by, for example, the classifier described herein), then an @ATF>1.0 is obtained using this classifier for the reduced size images. As such, the classifier used for the minimized image(s) may be the same or different than the classifier used for the original image. Furthermore, the classifier used for the original image is generally fixed, and is known prior to generating and classifying the minimized images. Along these lines, if a specified accuracy (e.g., 99%) is required and can be obtained, for example, with an SVM or other classifier for the smaller size images, then the system can deploy this classifier for optimal @ATF (regardless of the classifier used for the original image).

To further illustrate embodiment(s) of the present disclosure, an example is given herein. It is to be understood that this example (including the images and classifier used therein) is provided for illustrative purposes and is not to be construed as limiting the scope of the disclosed embodiment(s).

EXAMPLE

The method disclosed herein was performed using original packages for 10 authentic inkjet ink cartridges and 10 counterfeit inkjet ink cartridges. Five different image types were used, and black and white versions of the image types are respectively shown in FIGS. 2A through 2E. Each of the images was selected from the packaging layout (which was similar for both the original and counterfeit packages), and was scanned at 600×600 dots/inch (dpi) horizontal×vertical resolution using a desktop scanner (Hewlett Packard Scanjet 8200).

Figure 2A:
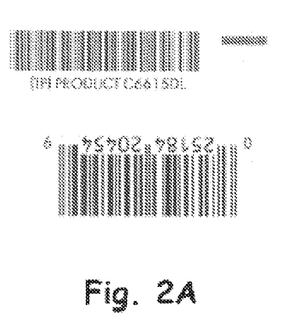
FIGS. 2A through 2E are black and white representations of colored images captured from both authentic inkjet cartridge packages and counterfeit inkjet cartridge packages and used in the Example discussed herein.
Figure 2B:
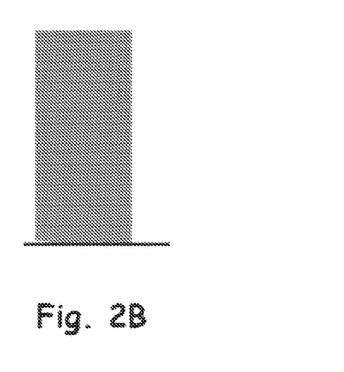
Figure 2C:
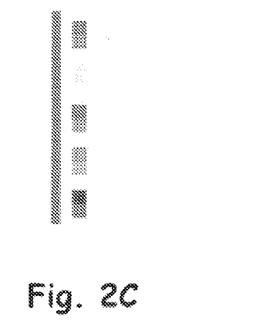
Figure 2D:
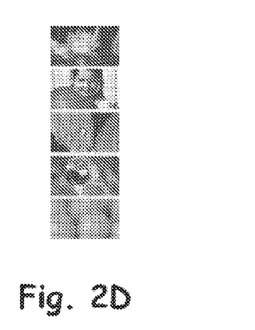
Figure 2E:
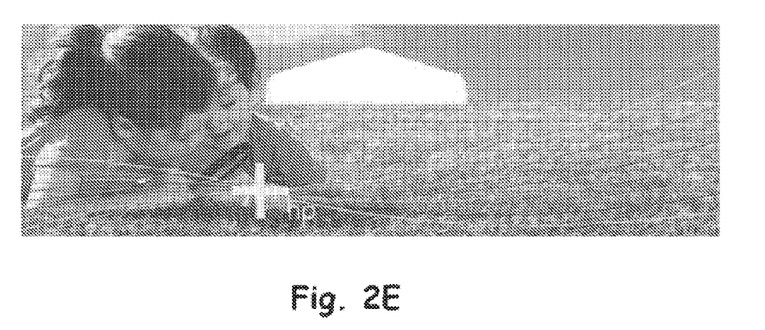

As shown in FIGS. 2A through 2E, respectively, the first of the images included a set of two barcodes (referred to in this example as "Barcode"), the second of the images included a blue spot color region (referred to in this example as "Blue", and shown in gray scale in FIG. 2B), the third of the images included a set of color targets (including, from the top of FIG. 2C moving downward, cyan, yellow, magenta, cyan and black targets, which are often used for print quality assurance) (referred to in this example as "Color", and shown in gray scale in FIG. 2C), the fourth of the images included a set of five branding images in color separated by a white border (referred to in this example as "Images", and shown in gray scale in FIG. 2D), and the fifth of the images included a single large colored image of two children in a meadow (referred to herein as "Meadow", and shown in gray scale in FIG. 2E). The image areas were approximately 2.7, 2.8, 2.3, 4.2 and 10.1 in$^2$, respectively. It is to be understood that the images did not contain variable data, and thus were not traditional security deterrents.

Ten image processing metrics were computed for each of the 100 images (5 each from the 10 authentic and the 10 counterfeit packages). These metrics included 1) image entropy, 2) standard deviation of the image histogram, 3) the percent of pixels with largest relative neighborhood variance, 4) the mean value for these edges, 5) the mean pixel variance, 6) mean saturation, and 7-10) the mean connected component region size and variance were computed after thresholding the images based on pixel intensity and based on saturation.

Each original 600×600 dpi image (designated I) was down-sampled, compressed (using jpeg compression), or both down-sampled and compressed to create a set of new minimized images. Down-sampling was performed using the ImageMagick "—resample" option, which is based on the Mitchell and Netravali algorithm. 5, 10, 20, 30, 40, 50, 60, 75, 100, 150, 200 and 300 dpi (dpi denotes resolution in dots/inch, and was the same in both the vertical×horizontal directions) minimized images were created via down-sampling. Jpeg compression was used with 1%, 2%, 3%, 6%, 11% and 25% settings. These compression settings were intentionally and respectively comparable in final image file size to the 60, 75, 100, 150, 200 and 300 dpi down-sampled images. The overall set of reduced-file size images (i.e., minimized images) created was given by Equation 5, where each reduced-file size image (referred to herein as $I_{RFS}$) has one of 12 down-sampling (DS) operations performed and/or one of 6 Jpeg compression (JC) operations performed. The $I_{RFS}$ image set size $(n(I_{RFS})=162)$ is provided by Equation 6, where $n(DS)=12$ and $n(JC)=6$.

$$I_{RFS} \in I(DS_{(5,10,\ldots,300)} \& | JC_{(1,2,3,6,11,25)}) \qquad (5)$$

$$n(I_{RFS})=2*n(DS)*n(JC)+n(DS)+n(JC) \qquad (6)$$

The down-sampled-only images are referred to herein as $I(DS_x)$, where x denotes the resolution of the down-sampled image. The jpeg-compressed-only images are referred to herein as $I(JC_y)$, where y denotes the jpeg compression size percentage. Images that were down-sampled and then jpeg-compressed are referred to herein as $I(DS_x, JC_y)$, while the images that were jpeg-compressed and then down-sampled are referred to herein as $I(JC_y, DS_x)$. Collectively, these 162 new images were designated the transformed image set for I.

The set of 10 metrics was sufficient for classification of "authentic" and "counterfeit" samples for each set of original (600×600 dpi) images (100% accuracy). The five different types of images had widely different values for the 10 image metrics.

The classifier described in Simske et al., "Low-resolution photo/drawing classification: metrics, method and archiving optimization", *Proceedings of the 2005 ACM Symposium on Document Engineering*, pp. 127-129 (2005, ISBN-59593-240-2), which is based on the assumption of a Gaussian distribution for each of the metrics, was used to identify authentic and counterfeit images for each of the five image types.

The classifier provided the statistical confidence at the critical point $(\alpha_{CPt})$, which is the accuracy during classification of each metric. The mean $\alpha_{CPt}$ of all 10 metrics $(\mu(\alpha_{CPt}))$ was computed for each minimized/transformed image and compared to the $\mu(\alpha_{CPt})$ for the ten metrics for the original 600 dpi images. When the $\mu(\alpha_{CPt})$ for the down-sampled and/or compressed image was greater than or equal to the $\mu(\alpha_{CPt})$ for the 600 dpi original images, it was concluded that it is more desirable to transform the original image and transmit the smaller image. This is due, at least in part to the fact that the minimized image can be classified with the same or better accuracy than the original image while reducing the bandwidth needed for transmission or receipt of such smaller image.

For the Barcode, Blue, Color, Images and Meadow image sets (represented in FIGS. 2A through 2E, respectively), $\mu(\alpha_{CPt})$ of the minimized/transformed images was, respectively, 0.895, 0.708, 0.787, 0.816 and 0.743 (i.e., ranging from 70.8% to 89.5% accuracy). These accuracies are representative of the accuracy of the individual metrics for each image.

The individual metric accuracies are combined to generate the overall classifier/classification accuracy. All of the metrics were weighted (e.g., via linear discriminant analysis, Fisher's the binary classifier, etc.) and added together, and then assigned to the class with the highest weight. In this Example, the overall classification accuracy (using the binary classifier and optimum sets of its 10 metrics (i.e., the combination of the best metrics providing the highest accuracy)) was 100% for most of the minimized/transformed images. As such, the classifier was, in general, capable of differentiating authentic from counterfeit images.

The at-accuracy throughput factor $(@A_{TF})$ was defined as the relative number of minimized images (compared to 1 at 600 dpi) that was successfully assigned to the counterfeit class or the authentic class with an accuracy greater than or equal to the accuracy obtained for the original 600 dpi images (when using all of the image metrics simultaneously), while using the same overall size in memory. The maximum $@A_{TF}$ for each of the four strategies (DS only; DS then JC; JC only; and JC then DS) for the Meadow, Images, Color and Blue image types is set forth in Table 1.

TABLE 1 maximum $@A_{TF}$ for each of the four strategies (DS and/or JC) for the Meadow, Images, Color and Blue image types*

| Image Type | Strategy | Best Setting for Strategy** | Max($@A_{TF}$) |
|---|---|---|---|
| Meadow | DS only | $DS_{10}$ | $3.6 \times 10^3$ |
|  | DS then JC | $DS_{30}$ then $JC_{25}$ | $1.6 \times 10^3$ |
|  | JC only | $JC_1$ | 100 |
|  | JC then DS | $JC_1$ then $DS_{10}$ | $3.6 \times 10^5$ |
| Images | DS only | $DS_{20}$ | 900 |
|  | DS then JC | $DS_{20}$ then $JC_1$ | $9 \times 10^4$ |
|  | JC only | $JC_6$ | 16.7 |
|  | JC then DS | $JC_1$ then $DS_{20}$ | $9 \times 10^4$ |
| Color | DS only | $DS_{200}$ | 9 |
|  | DS then JC | — | 1 |
|  | JC only | $JC_6$ | 16.7 |
|  | JC then DS | $JC_{11}$ then $DS_{150}$ | 145.5 |
| Blue | DS only | $DS_{300}$ | 4 |
|  | DS then JC | $DS_{30}$ then $JC_6$ | $6.67 \times 10^3$ |
|  | JC only | $JC_1$ | 100 |
|  | JC then DS | $JC_1$ then $DS_{20}$ | $9 \times 10^4$ |

*Barcode omitted since none of the minimized images resulted in accuracy greater than or equal to that for the original images
**$DS_X$ = down-sampling to X dpi; $JC_Y$ = Jpeg compression to Y % of the original file size The Barcode images did not classify better than the original images, i.e., the minimized Barcode images did not have a higher $\mu(\alpha_{CPt})$ after any minimizing transformation, and so maximum $@A_{TF}$ for the Barcodes was 1 for all four strategies.

The Meadow image type was the largest image evaluated, and thus was the image most suitable for the addition of covert information (such as a digital watermark). Down-sampling to as low as 10×10 dpi resulted in improved classification accuracy when compared to the original 600×600 dpi images. Since 3600 10×10 dpi images take up the same storage space as a single 600×600 dpi image, this corresponds to an $@A_{TF}$ value of 3600. When DS was followed by JC, improved classification accuracies were seen for max($@A_{TF}$) values of 1600, 800, 1200, 1066.7, 327.3 and 1600 for $JC_1$, $JC_2$, $JC_3$, $JC_6$, $JC_{11}$, and $JC_{25}$, respectively.

For the Meadow images, the JC-only strategy resulted in improved classification accuracy for all six settings, meaning max($@A_{TF}$)=100. For the same image set, when JC was followed by DS (which results in additional 4-100× reduction in image file size), all of the resulting (JC then DS) combinations provided improved classification accuracy compared to the original image, I. The exceptions were roughly equivalent to the original 0.743 classification accuracy (e.g., for $JC_1$ then $DS_{75}$, $\mu(\alpha_{CPt})$=0.743; for $JC_2$ then $DS_{75}$, $\mu(\alpha_{CPt})$=0.742; and for $JC_3$ then $DS_{75}$; $\mu(\alpha_{CPt})$=0.730. It is to be understood that the smaller images having roughly equivalent classification accuracy may still be more desirable than the corresponding original image for deployment because of the reduced bandwidth at which the minimized image is transmitted.

The Images set of images was classified with improved accuracy for nearly all DS-only images and DS then JC images to the size of $DS_{20}$. The exceptions were $DS_{40}$ then $JC_{11}$, $DS_{20}$ then $JC_{25}$, $DS_{30}$ then $JC_{26}$, and $DS_{40}$ then $JC_{25}$. For DS-only images, $\max(@A_{TF})$=900, and for DS then JC), $\max(@A_{TF})$ was $9\times10^4$ using $DS_{20}$ then $JC_1$. For JC only, both $JC_6$ and $JC_{25}$ resulted in improved classification accuracy, so that $\max(@A_{TF})$=16.7. For the Images set, JC followed by DS resulted almost universally in improved classification accuracy to compression rates as high as that provided by $DS_{20}$. The exceptions were ($JC_1$ then $DS_{300}$) and ($JC_2$ then $DS_{300}$). For (JC then DS), the $\max(@A_{TF})$=$9\times10^4$.

The classification accuracy of the Color and Blue image sets did not improve as universally as the accuracy of the Meadow and Images sets. However, for each of these sets, the JC strategy improved over the DS strategy, and the JC then DS strategy improved over the DS then JC strategy. The best strategies shown in this Example were suitable for the particular images studied. However, it is to be understood that different strategies will likely prove advantageous for different image sets.

For all four of these image types (i.e., Meadow, Images, Color and Blue) of this Example, the JC then DS strategy resulted in the highest overall $@A_{TF}$. The results set forth in this Example may seem counterintuitive, i.e., the smaller images actually classify with higher overall accuracy than the original images. It is believed that such results are achievable because of the classifier used. The classifier used in the Example was suitable for Gaussian data, and the down-sampling operation is an averaging operation. The image metrics of the down-sampled and Jpeg compressed images, therefore, are likely more Gaussian than the metrics of the original images. The fact that the JC then DS strategy is generally more effective than the DS then JC strategy supports this interpretation, since the DS images are smoother (have less high frequency artifacts) than the JC images.

The strategies and methods disclosed herein provide the means to highly increase the throughput of images for counterfeit detection without sacrificing accuracy. From the results of the method, one is able to determine whether minimized images may be used for subsequent product authentication. This advantageously allows a product owner to deploy products without security deterrents, which frees up real estate on the product packaging for more desirable printed information. Furthermore, the use of minimized images also reduces the bandwidth needed for electronic transmission of such images during the authentication process. This may be particularly advantageous as mobile camera imaging capabilities continue to increase.

Furthermore, as the method disclosed herein is used over time, automation may become possible by matching image metric values to the type of strategies used for such images. The matched metric values and corresponding strategies may be stored in a backend server, and accessed when preparing new, similar images for deployment. In such instances, the backend server may be queried using the metrics to determine a suitable reduction strategy. As such, it is believed that predictive metrics and the corresponding reduction strategies for such metrics will afford bypassing the need for upfront training of the system.

While several embodiments have been described in detail, it will be apparent to those skilled in the art that the disclosed embodiments may be modified. Therefore, the foregoing description is to be considered exemplary rather than limiting.

What is claimed is:

1. A counterfeit detection system, comprising:
    an image reduction system for minimizing size of at least one original image using a plurality of different reduction strategies to generate a plurality of minimized images; and
    a classification system including:
        a first sub-system for generating at least one accuracy comparative assessment metric for each of the plurality of minimized images;
        a second sub-system for comparing the at least one accuracy comparative assessment metric for each of the plurality of minimized images with an accuracy assessment metric for the at least one original image; and
        a third sub-system for determining if at least one of the plurality of minimized images can be transmitted with improved or equivalent classification accuracy at a reduced bandwidth when compared to the original image.

2. The system as defined in claim 1 wherein the classification system is configured to assess data with a modeled Gaussian distribution for the plurality of minimized images.

3. The system as defined in claim 1 wherein the plurality of different reduction strategies includes down-sampling strategies, compression strategies, sampling strategies, cropping strategies, mosaic strategies, cartooning strategies, strategies for generated paletted images, tokenizing strategies, or combinations thereof.

4. The system as defined in claim 1 wherein the at least one of the plurality of minimized images can be transmitted with improved or equivalent classification accuracy at the reduced bandwidth compared to the original image, and wherein the at least one of the plurality of minimized images has an at-accuracy throughput factor greater than 1.0.

5. The system as defined in claim 4 wherein the system is configured to optimize at least one of the classification accuracy or the at-accuracy throughput factor to a predetermined level.

6. The system as defined in claim 1 wherein the second sub-system for comparing is configured to determine if the at least one accuracy comparative assessment metric for at least one of the plurality of minimized images is greater than or equal to the accuracy assessment metric for the original image.

7. A method for enhancing counterfeit detection, comprising:
    minimizing size of at least one original image using a plurality of different reduction strategies to generate a plurality of minimized images;
    computing at least one accuracy comparative assessment metric for each of the plurality of minimized images;
    comparing the at least one accuracy comparative assessment metric for each of the plurality of minimized images with an accuracy assessment metric for the at least one original image; and
    determining, from the comparison, if at least one of the plurality of minimized images can be transmitted with improved or equivalent classification accuracy at a reduced bandwidth when compared to the at least one original image.

8. The method as defined in claim 7 wherein prior to determining, the method further comprises identifying, from the comparison, authenticity of each of the plurality of minimized images.

9. The method as defined in claim 7, further comprising:
selecting, from the comparison, an image size reduction process which includes one of the plurality of different reduction strategies that results in the at least one of the plurality of minimized images that can be transmitted with improved or equivalent classification accuracy at the reduced bandwidth when compared to the at least one original image; and
using the image size reduction process to generate at least one image for subsequent transmission and classification.

10. The method as defined in claim 7 wherein computing the at least one accuracy comparative assessment metric for each of the plurality of minimized images further includes calculating, using at least one classifier, a mean statistical confidence value at a critical point for each accuracy comparative assessment metric of the plurality of minimized images.

11. The method as defined in claim 10 wherein comparing the at least one accuracy comparative assessment metric for each of the plurality of minimized images with the accuracy assessment metric for the at least one original image includes determining if the mean statistical confidence value for each accuracy comparative assessment metric of the plurality of minimized images is greater than or equal to a mean statistical confidence value for corresponding accuracy assessment metrics of the at least one original image.

12. The method as defined in claim 11, further comprising determining an at-throughput accuracy factor for each of the plurality of minimized images.

13. The method as defined in claim 7, further comprising:
selecting a predetermined at-throughput accuracy factor for the at least one of the plurality of minimized images; and
selecting the plurality of different reduction strategies based upon the predetermined at-throughput accuracy factor.

14. The method as defined in claim 7, further comprising:
using a plurality of classifiers to compute a classification accuracy for each of the plurality of minimized images, thereby generating a plurality of classification accuracy measurements, each of which is associated with one of the plurality of classifiers;
comparing each classification accuracy measurement with a classification accuracy for the at least one original image, the classification accuracy for the at least one original image having been determined via a known, fixed classifier; and
determining, from the comparing, which of the plurality of classifiers generates the one of the plurality of minimized images that can be transmitted with the improved or equivalent classification accuracy.

15. The method as defined in claim 7, further comprising selecting the plurality of different reduction strategies to optimize at least one of the classification accuracy or an at-accuracy throughput factor to a predetermined level.

16. The method as defined in claim 7 wherein the plurality of different reduction strategies includes down-sampling strategies, compression strategies, sampling strategies, cropping strategies, mosaic strategies, cartooning strategies, strategies for generated paletted images, tokenizing strategies, or combinations thereof.

17. A method for enhancing counterfeit detection, comprising:
capturing an original image;
classifying the original image using a predetermined classifier, thereby generating a classification accuracy for the original image;
minimizing size of the original image using a plurality of different reduction strategies to generate a plurality of minimized images;
using a plurality of classifiers to compute a classification accuracy for each of the plurality of minimized images, thereby generating a plurality of classification accuracy measurements, each of which is associated with one of the plurality of classifiers;
comparing each classification accuracy measurement with the classification accuracy for the original image; and
determining, from the comparison, which of the plurality of classifiers generates one of the plurality of minimized images that can be transmitted with improved or equivalent classification accuracy at a reduced bandwidth when compared to the original image.

* * * * *